United States Patent
Shimizu et al.

(10) Patent No.: US 12,031,620 B2
(45) Date of Patent: Jul. 9, 2024

(54) SPROCKET AND CHAIN DRIVE SYSTEM

(71) Applicant: TSUBAKIMOTO CHAIN CO., Osaka (JP)

(72) Inventors: Shoichiro Shimizu, Osaka (JP); Yuta Watanabe, Osaka (JP); Akira Hirai, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/233,425

(22) Filed: Aug. 14, 2023

(65) Prior Publication Data

US 2024/0084885 A1 Mar. 14, 2024

(30) Foreign Application Priority Data

Sep. 12, 2022 (JP) ................................ 2022-144434
Jan. 11, 2023 (JP) ................................ 2023-002492

(51) Int. Cl.
*F16H 55/30* (2006.01)
*F16H 7/06* (2006.01)
(Continued)

(52) U.S. Cl.
CPC ........... *F16H 55/30* (2013.01); *F16H 55/088* (2013.01); *F16H 57/0495* (2013.01); *F16H 7/06* (2013.01);
(Continued)

(58) Field of Classification Search
CPC . F16H 55/30; F16H 7/06; F16H 55/08; F16H 55/084; F16H 2055/086;
(Continued)

(56) References Cited

U.S. PATENT DOCUMENTS 3,377,875 A * 4/1968 Sand .................... F16H 7/06
74/462
3,899,932 A * 8/1975 Durham .................. B62M 9/08
474/141
(Continued)

FOREIGN PATENT DOCUMENTS

JP 2020-85041 A 6/2020

OTHER PUBLICATIONS

Extended European Search Report dated Jan. 31, 2024, issued in couterpart EP Application No. 23194319.2. (11 pages).

*Primary Examiner* — Henry Y Liu
(74) *Attorney, Agent, or Firm* — WHDA, LLP

(57) ABSTRACT

An object of the present invention is to provide a sprocket that mitigates the impact of tension fluctuations resulting from load torque changes, suppresses noise and vibration, ensures stable chain behavior, prevents sprocket durability loss and the generation of harmonics during rotation, along with a chain drive system. Tooth roots between adjacent teeth of the sprocket include those with a radial deviation from a root circle of a standard tooth profile, set within a predetermined numerical range corresponding to a tooth pitch. A phase variation pattern is created by changing a root radius in accordance with an angular position. The phase variation pattern has a waveform with an amplitude varied within a range of (1/7)Amax, where Amax represents a maximum amplitude. The chain drive system includes a plurality of sprockets and a chain passed over the sprockets, at least one of them being the above-described sprocket.

10 Claims, 11 Drawing Sheets

(51) Int. Cl.
*F16H 55/06* (2006.01)
*F16H 55/08* (2006.01)
*F16H 57/04* (2010.01)

(52) U.S. Cl.
CPC ........ *F16H 55/06* (2013.01); *F16H 2055/086* (2013.01); *F16H 2055/306* (2013.01)

(58) Field of Classification Search
CPC ........... F16H 2035/003; F16H 57/0006; F16H 57/0495; F16H 55/06; F16H 2055/306
USPC ....................................................... 474/141
See application file for complete search history.

(56) References Cited

U.S. PATENT DOCUMENTS

| | | | | |
|---|---|---|---|---|
| 4,865,577 A | * | 9/1989 | Freudenstein | B62M 9/08 29/893.1 |
| 5,882,025 A | * | 3/1999 | Runnels | B62M 9/08 280/259 |
| 6,155,943 A | * | 12/2000 | Ledvina | F16H 55/30 160/157 |
| 6,213,905 B1 | * | 4/2001 | White | F16H 7/06 474/148 |
| 7,108,622 B2 | | 9/2006 | Okabe | |
| 7,125,356 B2 | * | 10/2006 | Todd | F16H 55/30 474/160 |
| 7,128,673 B2 | * | 10/2006 | Kubo | F16H 55/30 474/202 |
| 7,442,139 B2 | * | 10/2008 | Kubo | F16H 55/08 474/154 |
| 7,534,182 B2 | * | 5/2009 | Sonoda | F16H 55/08 474/202 |
| 7,654,925 B2 | * | 2/2010 | Todd | F16H 55/30 474/160 |
| 7,691,020 B2 | * | 4/2010 | Sakura | F16H 55/30 474/212 |
| 7,699,733 B2 | * | 4/2010 | Sakura | F16H 55/30 474/161 |
| 7,713,156 B2 | * | 5/2010 | Sakura | F16H 55/30 474/161 |
| 7,749,117 B2 | * | 7/2010 | Carrasco Vergara | B62M 9/08 280/259 |
| 8,062,158 B2 | * | 11/2011 | Nakano | F01L 1/022 474/160 |
| 8,066,601 B2 | * | 11/2011 | Nakano | F01L 1/02 474/160 |
| 8,118,699 B2 | * | 2/2012 | Sakura | F16H 55/08 474/154 |
| 8,202,185 B2 | * | 6/2012 | Haesloop | F16H 55/30 474/191 |
| 8,430,775 B2 | * | 4/2013 | Todd | F01L 1/022 474/160 |
| 11,009,114 B2 | * | 5/2021 | Kurematsu | F16H 55/30 |
| 11,193,563 B2 | * | 12/2021 | Lacy | F01L 1/047 |
| 11,499,620 B2 | * | 11/2022 | Kurematsu | F16H 7/06 |
| 2002/0169043 A1 | * | 11/2002 | Liu | B62M 9/08 474/160 |
| 2003/0087714 A1 | * | 5/2003 | Todd | F16H 55/30 474/202 |
| 2005/0119079 A1 | * | 6/2005 | Okabe | F16G 13/06 474/155 |
| 2006/0135304 A1 | * | 6/2006 | Sonoda | F16H 55/08 474/152 |
| 2006/0240925 A1 | * | 10/2006 | Todd | F16H 55/30 474/160 |
| 2007/0066430 A1 | * | 3/2007 | Gajewski | F16H 55/30 474/141 |
| 2008/0009377 A1 | * | 1/2008 | Sakura | F16H 7/06 474/141 |
| 2008/0085799 A1 | * | 4/2008 | Lacy | F16H 7/023 474/141 |
| 2008/0161144 A1 | * | 7/2008 | Hirai | F16H 55/30 474/141 |
| 2008/0176688 A1 | * | 7/2008 | Sakura | F16H 7/06 474/141 |
| 2009/0170648 A1 | * | 7/2009 | Nakano | F16H 55/30 474/141 |
| 2009/0209380 A1 | * | 8/2009 | Hirai | F16H 55/30 474/156 |
| 2009/0286640 A1 | * | 11/2009 | Sakura | F16H 55/08 474/153 |
| 2010/0041501 A1 | * | 2/2010 | Rettig | F16H 55/36 474/141 |
| 2010/0160100 A1 | * | 6/2010 | Gajewski | F16H 35/02 474/152 |
| 2010/0167857 A1 | * | 7/2010 | Todd | F16H 55/30 474/155 |
| 2010/0292038 A1 | * | 11/2010 | Todd | F01L 1/022 474/148 |
| 2020/0003292 A1 | | 1/2020 | Crump | |
| 2020/0158223 A1 | * | 5/2020 | Kurematsu | F16H 55/30 |

* cited by examiner

SPROCKET AND CHAIN DRIVE SYSTEM

BACKGROUND OF THE INVENTION

1. Field of the Invention

The present invention relates to a sprocket with a plurality of teeth that mesh with a chain, and a chain drive system that uses this sprocket.

2. Description of the Related Art

Drive systems with a chain passing over sprockets that have multiple teeth on the circumferential surface have been commonly used as a power transmission system that reliably transmits rotation.

The engagement between the sprocket teeth and the chain enables reliable transmission of a rotational force from one sprocket to another at given timing. On the other hand, the engagement between the sprocket teeth and the chain inevitably involves the generation of noise and vibration.

Chain drive systems experience periodic load torque fluctuations during rotation. To address this issue, some known sprockets are designed to mitigate tension fluctuations in synchronization with the periodic changes in load torque. These sprockets have teeth with a phase variation pattern, which causes phasing to alternately advance and retard in relation to a zero phase of engagement between equidistant teeth and a chain. This design minimizes the impact of tension fluctuations resulting from the changes in load torque and helps suppress the noise and vibration.

Japanese Patent Application Publication No. 2020-085041, for example, discloses a sprocket design that involves continuous variation of the radial position of the non-loaded seating point of the chain between adjacent teeth along the circumferential direction. Namely, the sprocket has a phase variation pattern created by varying the radial positions of multiple non-loaded seating points in accordance with the angular positions.

SUMMARY OF THE INVENTION

The sprocket described in Japanese Patent Application Publication No. 2020-085041 has a constant tooth pitch while the root radius is varied. As long as the load transmitted between the chain and the sprocket is evenly distributed among the multiple teeth, the sprocket's durability is unlikely to be compromised.

However, depending on the amplitude or period of the waveform representing the phase variation pattern, the chain may experience increased polygonal action and accumulate higher kinetic energy. This results in unstable chain behavior and adversely affects the load distribution, ultimately compromising the strength of the sprocket.

Given the circumstances, the task of suppressing the noise and vibration while maintaining the durability of the chain and sprocket is a challenging one. Compromised load distribution accelerates wear on the sprocket teeth, and leads to another issue of a premature loss of noise reduction effectiveness.

The present invention offers solutions to these problems and aims to provide a sprocket that mitigates the impact of tension fluctuations resulting from load torque changes, effectively suppresses noise and vibration, ensures stable chain behavior, prevents sprocket durability loss, and minimizes generation of harmonics during rotation, along with a chain drive system.

The present invention achieves the above object by providing a sprocket having a plurality of teeth that mesh with a chain, the plurality of teeth being designed with a waveform phase variation pattern that causes phasing to advance and retard in relation to a zero phase of engagement between equidistant teeth and a chain, some of tooth roots between adjacent teeth being deviated radially away from a root circle of a standard tooth profile, a maximum root deviation being set within a range of 2 to 7% of a tooth pitch of the teeth, the phase variation pattern being created by changing root radii in accordance with angular positions, the waveform phase variation pattern having an amplitude that is varied within a range of $(1/7)A_{max}$, where $A_{max}$ represents a maximum amplitude.

A standard tooth profile herein refers to a sprocket with teeth having a constant root circle radius and arranged at a constant angle about the axial center (a tooth profile with a constant pitch, which is the distance between the centers of circumferentially adjacent teeth).

The present invention achieves the above object by providing a chain drive system including a plurality of sprockets and a chain passed over the sprockets. The sprockets include a drive sprocket provided to a crankshaft and a driven sprocket provided to a camshaft. The sprocket described above is used for at least one of the drive sprocket and the driven sprocket.

The sprocket according to claim 1, with a plurality of teeth that is basically designed with a phase variation pattern, demonstrates dynamic responsiveness to load torque changes and mitigates the impact of chain tension fluctuations. This enables the suppression of noise and vibration.

The phase variation pattern is created by changing the root radii of the teeth in accordance with their angular positions. The waveform amplitude of the phase variation pattern is varied within a predetermined range. This increases the wrapping of the chain around the sprocket. As a result, more teeth of the sprocket bear the chain tension, which helps stabilize the chain behavior during the chain operation. This feature minimizes generation of mesh harmonic noise as well as enables dispersion of the mesh harmonics. The phase variation pattern also prevents generation of excessive contact forces and enables uniform load distribution. This reduces the wear on the meshing parts and prevents loss of durability.

According to the configuration set forth in claim 2, the chain oscillation during the operation is minimized, so that the overall behavior of the chain can be further stabilized.

According to the configuration set forth in claim 3, the polygonal action of the chain can be reduced. As a result, the kinetic energy decreases due to the lowered speed of the chain in the up and down direction, which enables reduction of the overall noise (overall noise level) of the chain drive system. A widened tooth pitch of the sprocket in relation to the chain pitch results in less "play" in the chain. This helps prevent unevenness in load distribution, and increase the strength of the sprocket and chain. The term "play" here refers to the state where the teeth of the sprocket, which the chain wraps around, are not subjected to any load due to the absence of periodicity in the sprocket teeth.

According to the configuration set forth in claim 4, the periodically occurring mesh harmonic noise can be reduced by adjusting the polygonal action of the chain.

According to the configuration set forth in claim 5, unevenness in load distribution is prevented, and harmonics are effectively reduced.

According to the configuration set forth in claim 6, the enhanced oil retainability on the tooth surface of the sprocket increases the lubrication area in the contact regions with the chain, which helps minimize the wear. Furthermore, the pores attenuate air vibrations and contribute to the noise reduction. Moreover, by adjusting the sintering density to control the mass, it is possible to shift the points of resonance that occur when the sprocket meshes with the chain.

According to the chain drive system set forth in claim 7, at least one of the drive sprocket and the driven sprocket is the sprocket described above. The sprocket mitigates the impact of tension fluctuations resulting from load torque changes, effectively suppresses the noise and vibration, ensures stable chain behavior, prevents sprocket durability loss, and minimizes the generation of mesh harmonic noise.

According to the configuration set forth in claim 8, the driven sprocket is configured to have a phase variation pattern in opposite phase to the phase variation pattern of the drive sprocket. The inter-shaft distance variations resulting from the varying root radius, combined with the root radius variations around two or more shafts, enable dispersion of the meshing harmonics. This feature also helps suppress the variations in inter-shaft distance so that the chain tension can be reduced. As a result, the sprocket teeth will undergo less change in profile, so that the effects of reducing the overall noise level (OA) and meshing frequency harmonics (specific frequency noise) can be maintained over a long time.

According to the configuration set forth in claim 9, the impact of chain tension fluctuations corresponding to variations associated with the crankshaft is mitigated, which enables the suppression of noise and vibration.

According to the configuration set forth in claim 10, the impact of torque changes, which are the major cause of noise and vibration, can be effectively mitigated.

DESCRIPTION OF THE PREFERRED EMBODIMENTS

Embodiments of the present invention will be hereinafter described with reference to the drawings.

Embodiment 1

The sprocket according to Embodiment 1 has a plurality of teeth that mesh with rollers of a roller chain, for example. The teeth are designed with a waveform phase variation pattern that causes phasing to advance and retard in relation to a zero phase of engagement between equidistant teeth and a chain.

Figure 1:
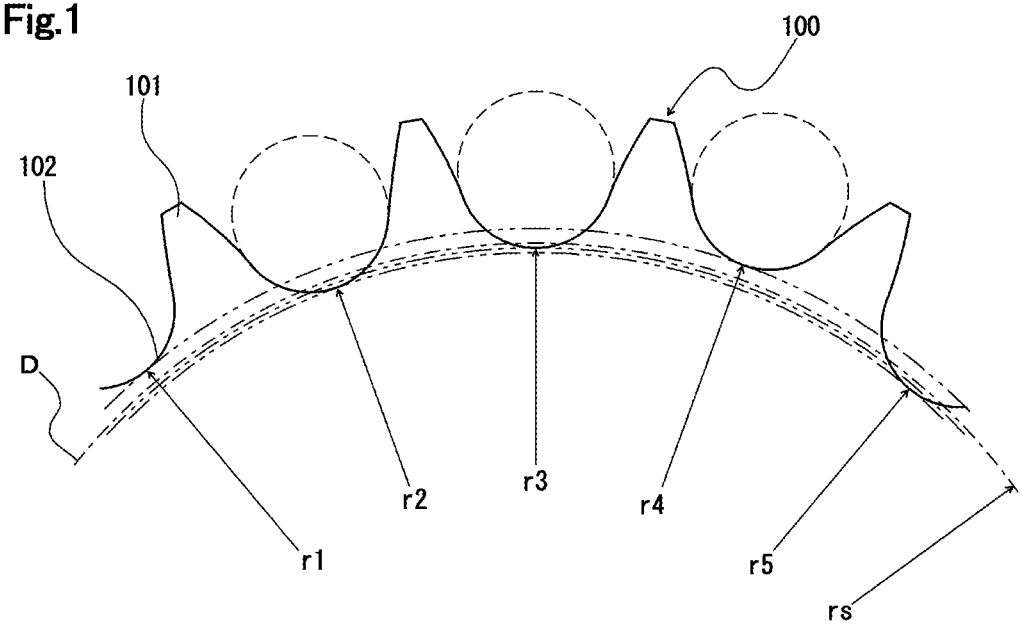
FIG. 1 is a schematic diagram illustrating a part of one configuration example of a sprocket according to Embodiment 1 of the present invention.

The plurality of teeth 101 are arranged circumferentially at an equal pitch on the sprocket 100 according to Embodiment 1 as shown in FIG. 1. The tooth roots 102 between adjacent teeth 101 include those with a root deviation, either offset radially outwards or inwards from the root circle D of a standard tooth profile. The maximum root deviation is set within the range of 2 to 7% of the tooth pitch of the teeth 101. This feature enables a uniform load distribution on the teeth 101. Reference symbol rs in FIG. 1 denotes the radius of the root circle D.

Figure 2:
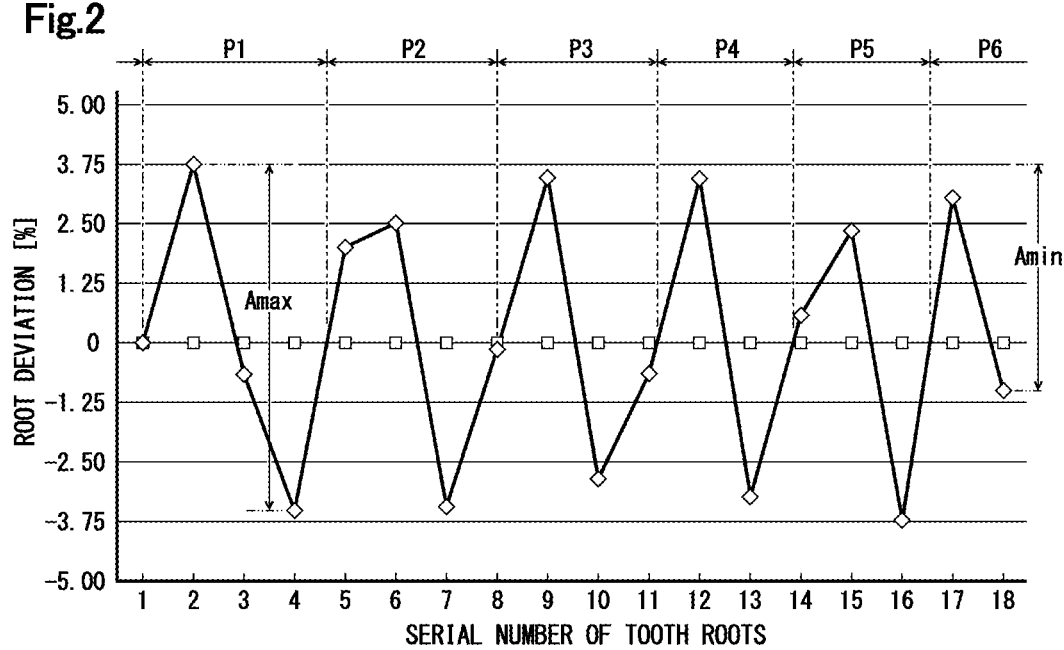
FIG. 2 is a graph showing one example of a phase variation pattern of the sprocket according to Embodiment 1.

The phase variation pattern is created by continuously increasing or decreasing the root radius ($r_1$, $r_2$, $r_3$, $r_4$, $r_5$, . . . ) in accordance with the angular position along the circumferential direction. FIG. 2 shows one example of the waveform phase variation pattern created by root deviations. The vertical axis of FIG. 2 represents the ratio [%] of root deviation relative to the tooth pitch. Negative values on the vertical axis indicate root radii that are smaller than the root radius of the standard tooth profile. The horizontal axis of FIG. 2 represents the serial number of the tooth roots.

The root deviations being shown are those for creating the phase variation pattern of a sprocket that has eighteen teeth. The pattern has six cycles, P1 to P6, for example, their wavelengths continuously decreasing along the circumferential direction. "Cycles" as used herein represent sets of alternating positive and negative fluctuations (peaks and valleys) in the waveform phase variation pattern, i.e., the term "cycle" herein includes cycles with varying wavelengths.

The sprocket having the plurality of teeth 101 with this phase variation pattern demonstrates dynamic responsiveness to load torque changes and mitigates the impact of chain tension fluctuations. This in turn enables the suppression of noise and vibration.

The phase variation pattern created by root deviations is designed with waveform amplitude adjustments confined within the range of (1/7)Amax, where Amax represents the maximum amplitude. Namely, the minimum amplitude Amin is larger than (1/7)Amax.

Varying the root radius of the sprocket 100 causes the sitting positions of rollers of a roller chain, for example, to vary in the radial direction corresponding to the root radius. However, the polygonal action of the chain can be minimized by confining the changes of the waveform amplitude within the predetermined range. As a result, more teeth 101 of the sprocket bear the chain tension, so that the wrapping of the chain around the sprocket 100 is increased and the chain behavior during the operation is stabilized. This in turn minimizes the generation of mesh harmonic noise and disperses the mesh harmonics.

Figure 3A:
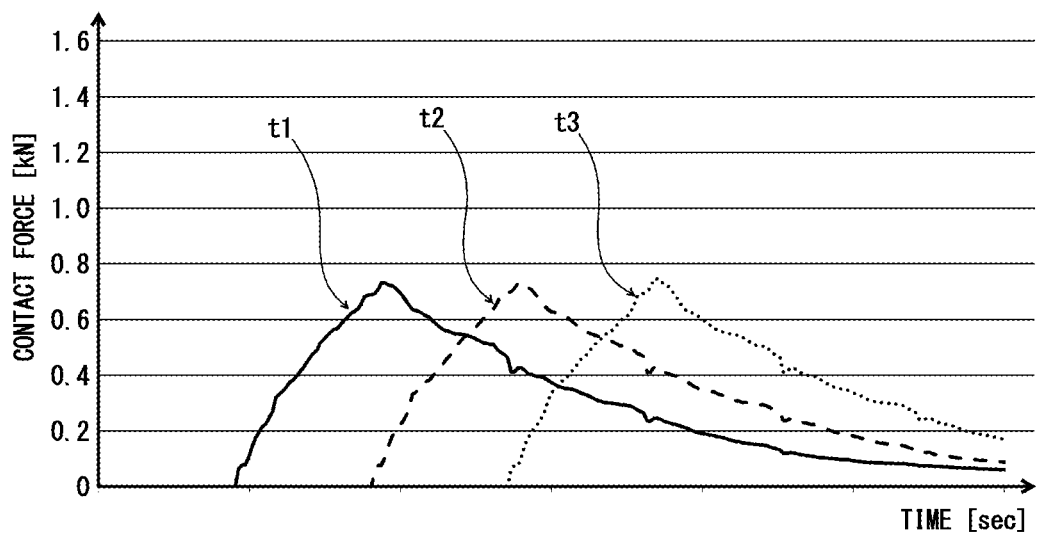
FIG. 3A is a graph showing the changes over time in the contact force of a chain on sprocket teeth that have a standard tooth profile.
Figure 4:
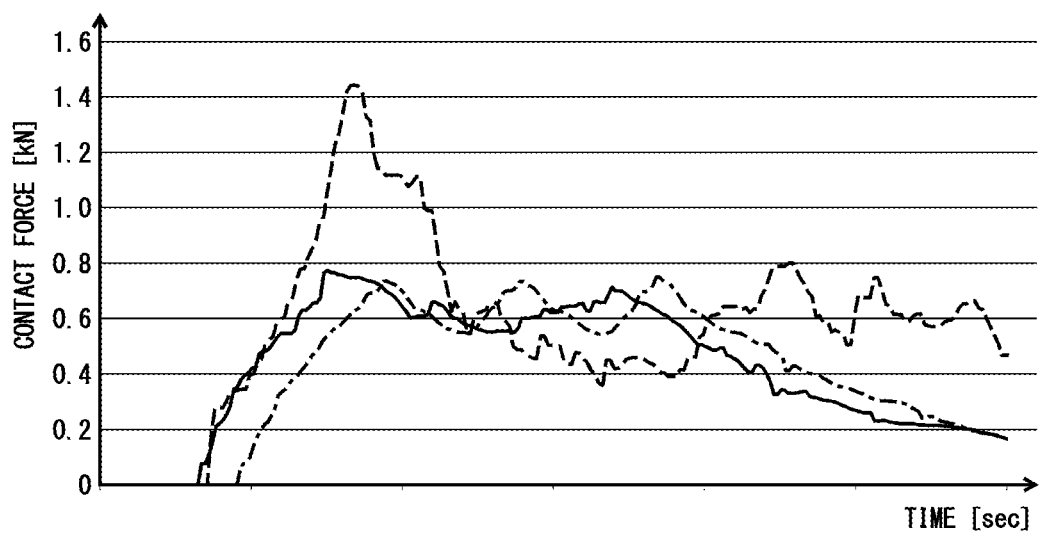
FIG. 4 is a graph showing the changes over time in the maximum contact force of the chain on the sprocket.

The variation pattern also prevents the generation of excessive contact forces and enables a uniform load distribution. This reduces the wear on the meshing parts and prevents loss of durability. The contact force exerted on individual teeth of the sprocket by the chain increases over time, and after reaching a peak value, tends to decrease gradually over time. Sprocket teeth of a standard tooth profile evenly distribute the load as the multiple teeth successively engage with the chain at a predetermined interval, as shown in FIG. 3A. As indicated by the one-dot chain line curve in FIG. 4, there are no sudden fluctuations in the overall maximum value of contact force over time exerted on the sprocket, or surges in the chain tension. For illustrative purposes, FIG. 3A and FIG. 4 depict the contact forces exerted by the chain on only three successive teeth t1 to t3 as they engage with the chain in sequence.

Figure 3B:
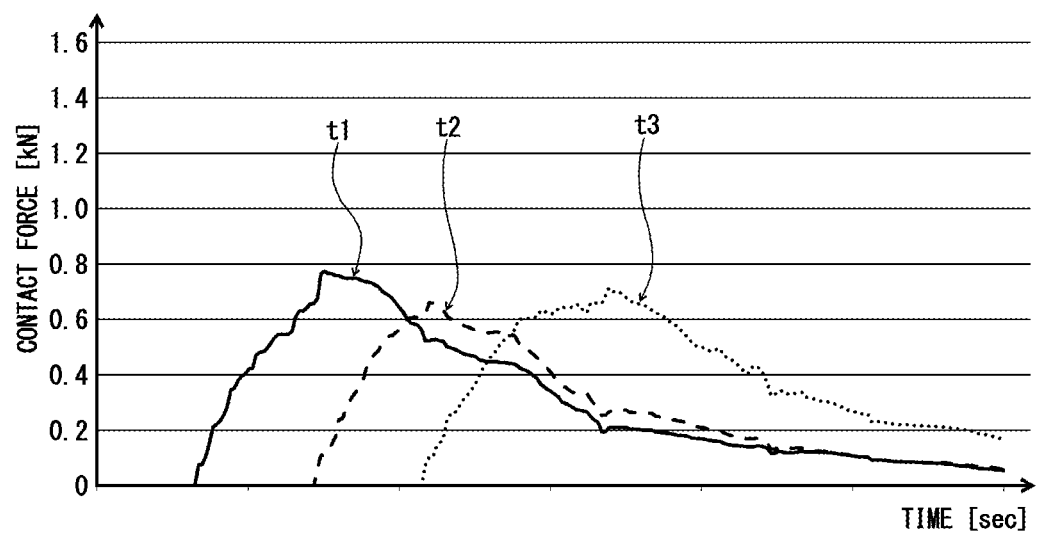
FIG. 3B is a graph showing the changes over time in the contact force of a chain on the teeth of the sprocket according to Embodiment 1.

While the timing of the meshing of the sprocket 100 in Embodiment 1 varies corresponding to the root radius, the load distribution on the teeth is kept substantially uniform as shown in FIG. 3B. This is achieved by setting the root deviations in accordance with the tooth pitch of the teeth 101 and by constraining the changes in amplitude of the waveform representing the phase variation pattern within the predetermined range. At the same time, as indicated by the solid line curve in FIG. 4, it is possible to minimize sudden fluctuations in the maximum value of contact force over time, or surges in the chain tension. The prevention of surges in chain tension minimizes stress generation, which helps avoid a decrease in durability. For illustrative purposes, FIG. 3B depicts the contact forces exerted by the chain on only three successive teeth t1 to t3 as they engage with the chain in sequence.

Figure 5:
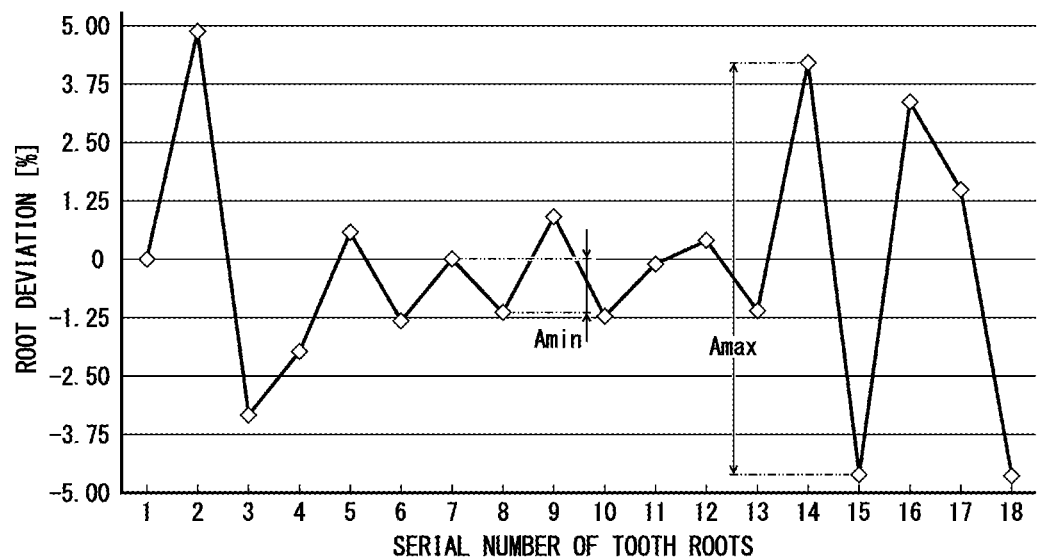
FIG. 5 is a graph showing one example of a phase variation pattern of Comparative Sprocket 1.
Figure 6:
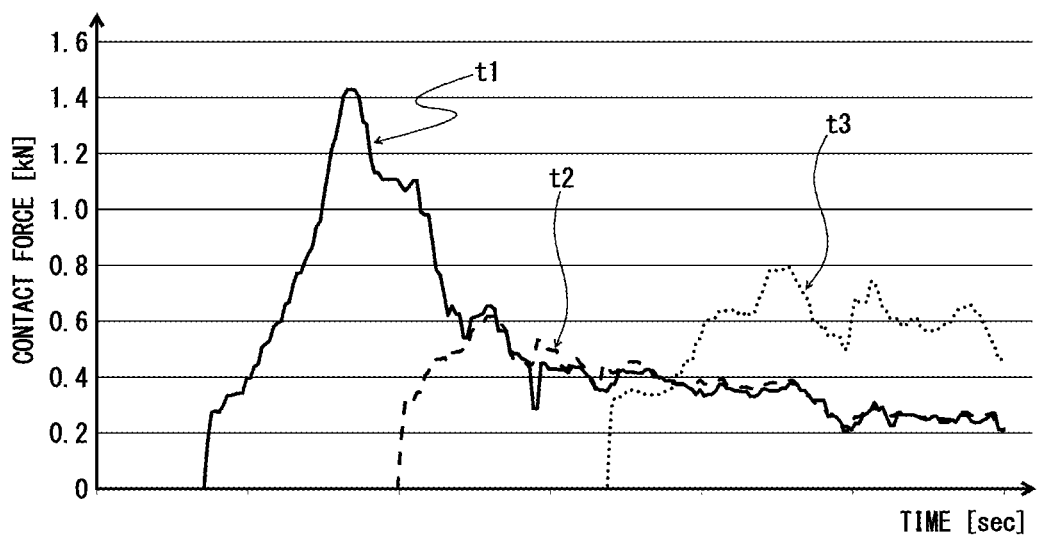
FIG. 6 is a graph showing the changes over time in the contact force of the chain on the teeth of Comparative Sprocket 1.

FIG. 5 shows the root deviations of Comparative Sprocket 1 in which the minimum amplitude Amin is set smaller than (1/7)Amax. In this case, the load distribution is uneven as shown in FIG. 6. Sudden fluctuations occur in the maximum value of contact force over time as indicated by the broken line curve in FIG. 4, which adversely affects the load distribution. The uneven distribution accelerates the wear on the sprocket teeth, resulting in a premature loss of noise reduction effectiveness. For illustrative purposes, FIG. 6 depicts the contact forces exerted by the chain on only three successive teeth t1 to t3 as they engage with the chain in sequence.

The phase variation pattern is designed such that there are cycles in the teeth that increase continuously in the circumferential direction. The "cycles in the teeth" here refer to the periods of (corresponding) sine curves Asin(Bx) that represent changes in value matching the changes in root deviation. For example, if an n-th tooth root positioned downstream in the sprocket's rotation direction of the n-th tooth has a root deviation that equals to the root deviation of the n-th tooth root in the variation pattern represented by a sine curve having a period of "a", it can be said that the cycle of this n-th tooth is "a".

Figure 7:
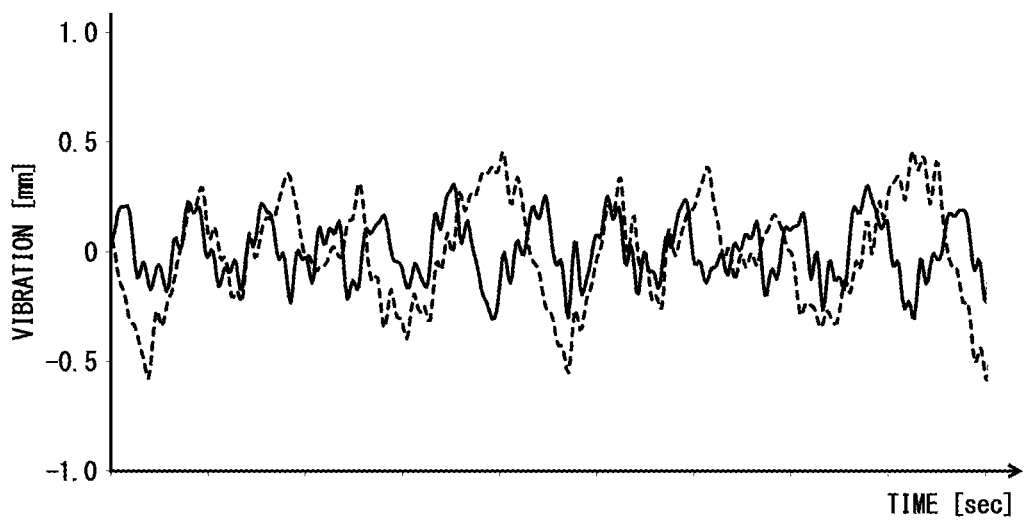
FIG. 7 is a graph showing the changes over time in the vibration of the chain with the use of the sprocket according to Embodiment 1.

The minimum cycle in the teeth should preferably be set within the range of 2 to 10, for example. The variation range of the cycles in the teeth represented by the difference between the maximum and minimum cycles should preferably be no greater than 21. With these settings, the vibration of the chain can be suppressed as indicated by the solid line curve in FIG. 7. By minimizing the chain oscillation during the operation, the overall behavior and stability of the chain can be improved. The chain vibration was evaluated by measuring the displacements of the chain from a reference position when it was not loaded (where there is no vibration) using a gap sensor.

Figure 8:
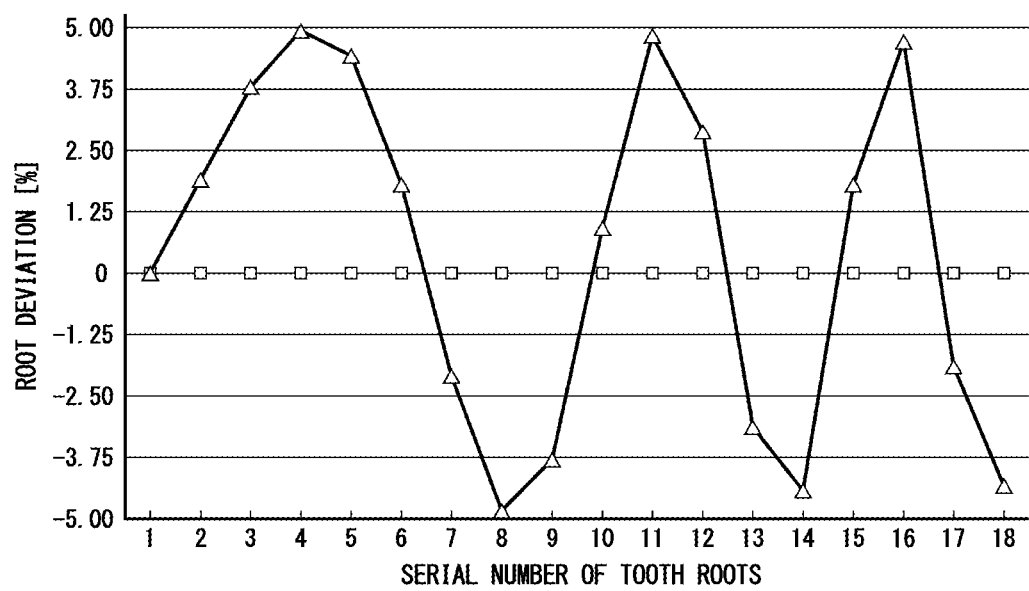
FIG. 8 is a graph showing one example of a phase variation pattern of Comparative Sprocket 2.

FIG. 8 shows the root deviations of a comparative sprocket having a phase variation pattern with the minimum cycle in the teeth being set less than 2. In the case of this sprocket, the chain demonstrates unstable behavior and produces excessive vibration as indicated by the broken line curve in FIG. 7. Consequently, the increased chain tension adversely affects the durability. On the other hand, if the phase variation pattern is designed such that the minimum cycle in the teeth exceeds 10, it can lead to chain strength inconsistency and excessive vibration. This in turn increases the chain tension, and negatively impacts the durability.

If the phase variation pattern is designed such that the cycles in the teeth are varied by more than 21, it becomes challenging to design the phase variation pattern in a waveform with a minimum cycle in the teeth of 2 or more. This can result in chain strength inconsistency and excessive vibration, and may compromise the durability due to the increased chain tension.

The sprocket 100 is made from a sintered body with a porous structure designed to retain impregnated lubricating oil.

As a result, the sprocket provides a larger lubrication area in the contact regions with the chain. This enhanced oil retainability on the tooth surface of the sprocket 100 helps minimize wear. Furthermore, the pores attenuate air vibrations and contribute to noise reduction. Moreover, by adjusting the sintering density to control the mass, it is possible to shift the points of resonance that occur when the sprocket meshes with the chain.

While the plurality of teeth are arranged along the circumferential direction with a constant tooth pitch in the configuration described above, there may be variations in the tooth pitch between circumferentially adjacent teeth.

The tooth pitch may vary in accordance with the angular position, for example, corresponding to the root deviations that create the phase variation pattern. It is preferable to limit the deviations of the tooth pitch from the tooth pitch of a standard tooth profile within the range of ±1%. Such variations can be designed to increase or decrease the polygonal action of the chain, which helps to further reduce the periodically occurring mesh harmonic noise.

Embodiment 2

Figure 9:
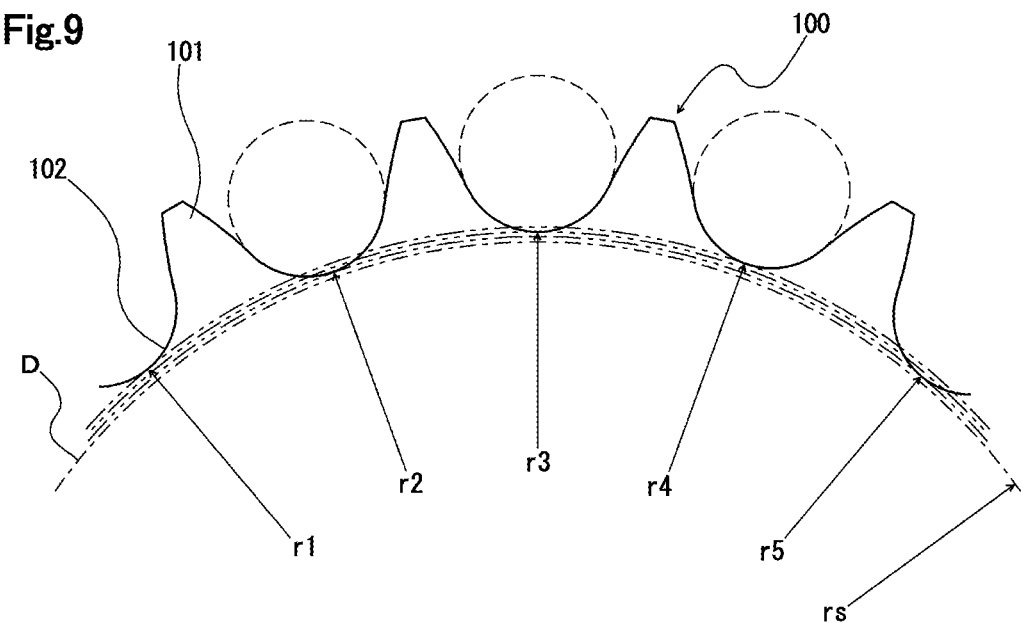
FIG. 9 is a schematic diagram illustrating a part of one configuration example of a sprocket according to Embodiment 2 of the present invention.

FIG. 9 is a schematic plan view illustrating a part of the configuration of a sprocket according to Embodiment 2 of the present invention.

The sprocket 100 in Embodiment 2 is configured similarly to the sprocket in Embodiment 1, with the exception that all tooth roots 102 have larger radii (r1, r2, r3, r4, r5, . . . ) than the radius rs of the root circle D of a standard tooth profile. Namely, as indicated by the solid line curve in FIG. 10, the sprocket 100 in Embodiment 2 does not include tooth roots 102 that are deviated radially inwards from the radius rs of the root circle D of the standard tooth profile (plotted with squares in FIG. 10).

Figure 10:
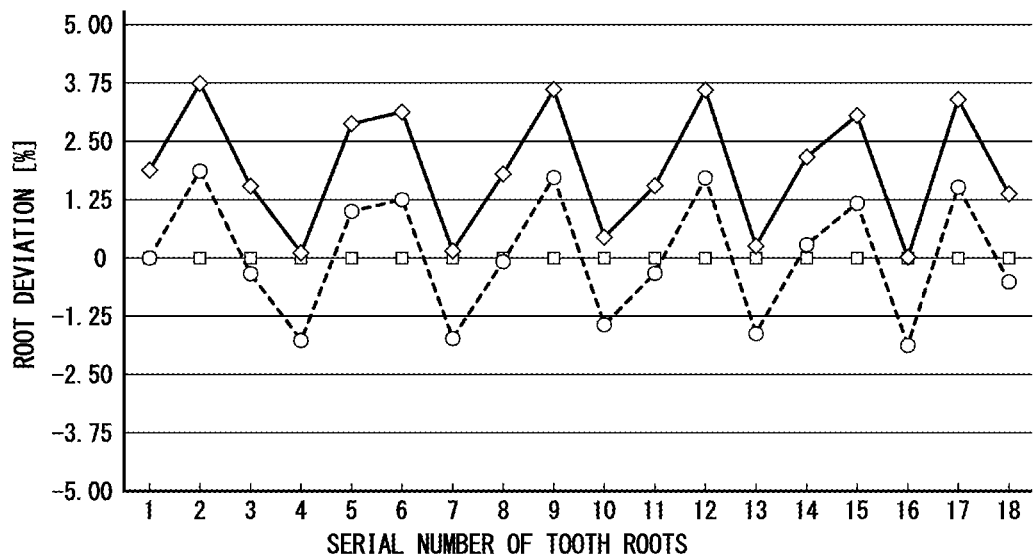
FIG. 10 is a graph showing one example of a phase variation pattern of the sprocket according to Embodiment 2.
Figure 11:
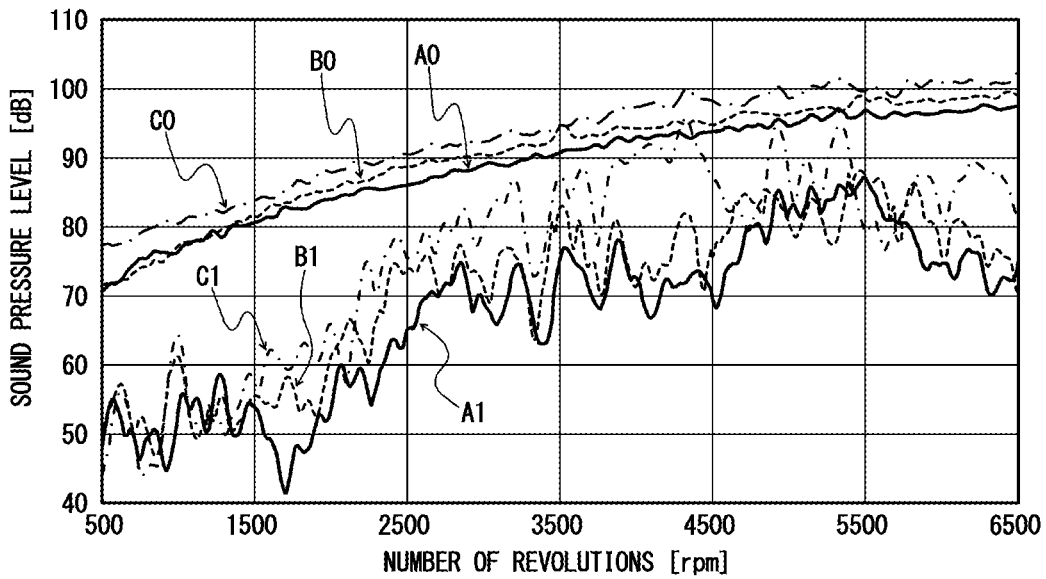
FIG. 11 is a graph showing the changes in the overall noise level and the fundamental harmonic of mesh noise of the sprocket according to Embodiment 2 in relation to the RPM.

The broken line curve in FIG. 10 represents the root deviations of Comparative Sprocket 3 that includes tooth roots that are deviated radially inwards from the radius rs of the root circle D of the standard tooth profile. Even this sprocket can suppress the overall noise level (indicated by broken line curve B0 in FIG. 11) and the fundamental harmonic of mesh noise (indicated by broken line curve B1 in FIG. 11) as compared to the sprocket with the standard tooth profile. In FIG. 11, one-dot chain line curve CO represents the overall noise level and one-dot chain line curve Cl represents the fundamental harmonic of mesh noise of the sprocket with the standard tooth profile.

Figure 12:
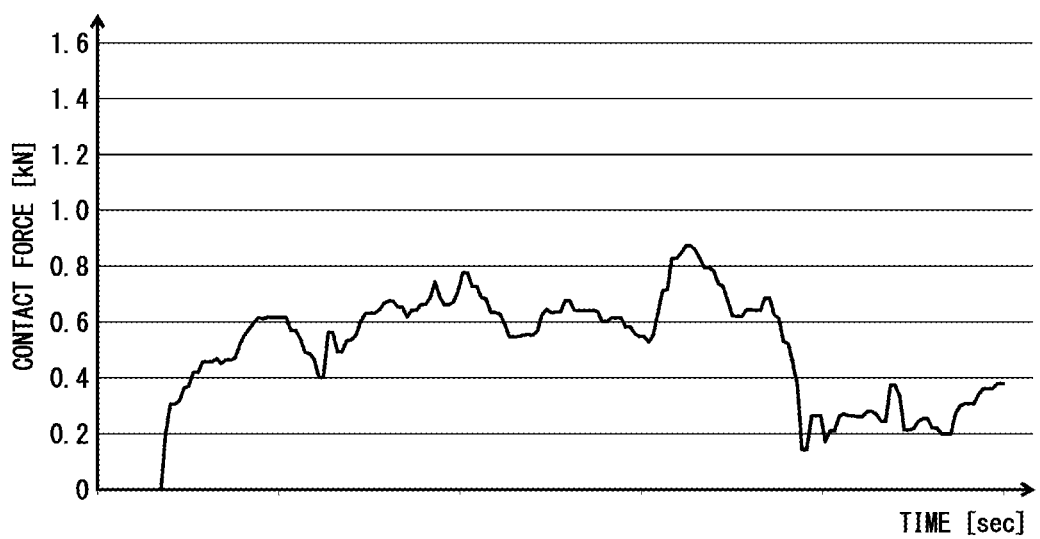
FIG. 12 is a graph showing the changes over time in the maximum contact force of the chain on Comparative Sprocket 3.
Figure 13:
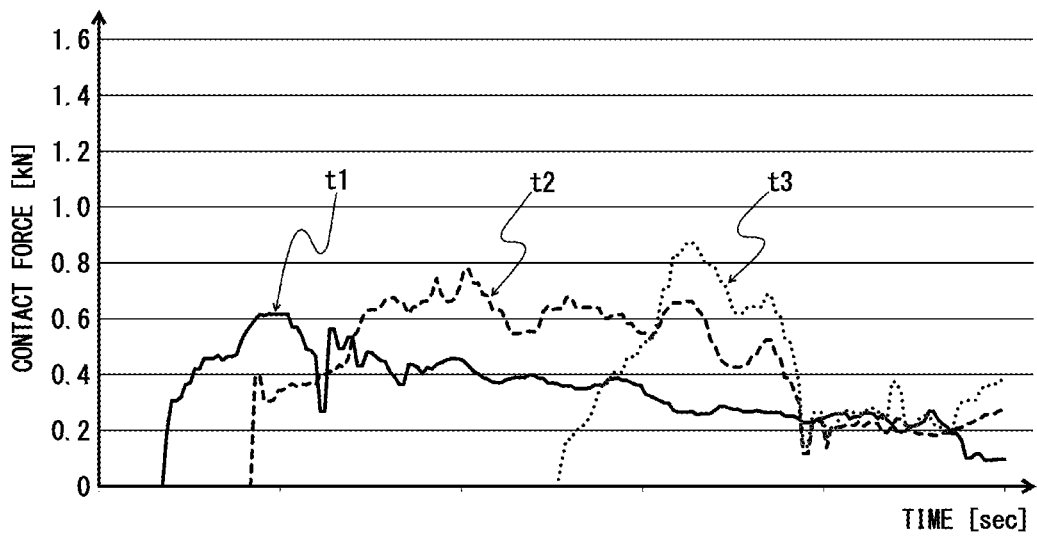
FIG. 13 is a graph showing the changes over time in the contact force of the chain on the teeth of Comparative Sprocket 3.

If the phase variation pattern is designed such that the maximum root deviation is set within a range of less than 2% of the tooth pitch of the teeth 101, while there will be no sudden fluctuations in the overall maximum value of contact force over time exerted on the sprocket as shown in FIG. 12, the load distribution on the teeth will become uneven as shown in FIG. 13. For illustrative purposes, FIG. 12 and FIG. 13 depict the contact forces exerted by the chain on only three successive teeth t1 to t3 as they engage with the chain in sequence.

Making the root radii (r1, r2, r3, r4, r5, . . . ) larger than the radius rs of the root circle D of a standard tooth profile reduces the polygonal action of the chain. This means that the kinetic energy of the chain decreases due to the speed reduction in the up and down direction, which leads to further reduction of the overall noise level (indicated by solid line curve A0 in FIG. 11) and the fundamental harmonic of mesh noise (indicated by solid line curve A1 in FIG. 11).

Figure 14:
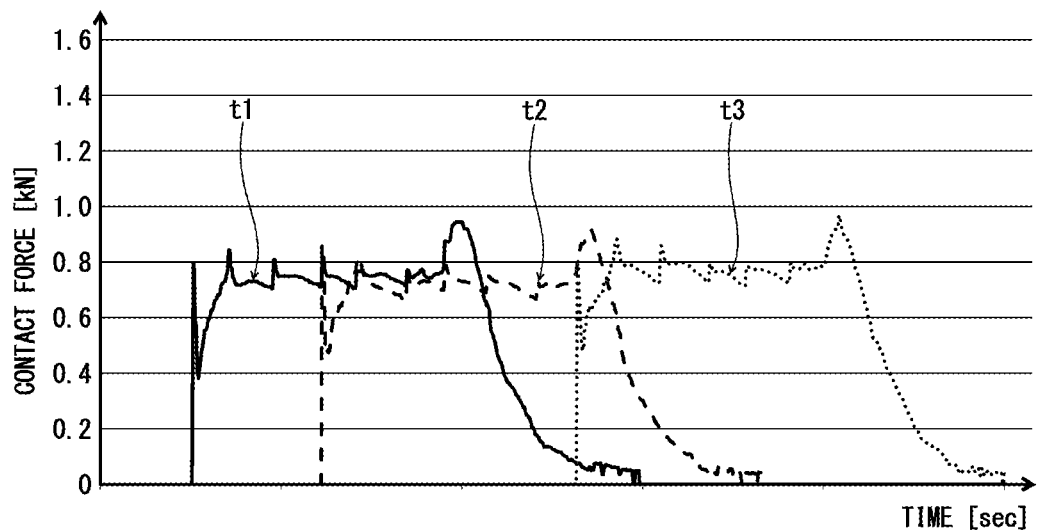
FIG. 14 is a graph showing the changes over time in the contact force of a chain on the teeth of the sprocket according to Embodiment 2.
Figure 15:
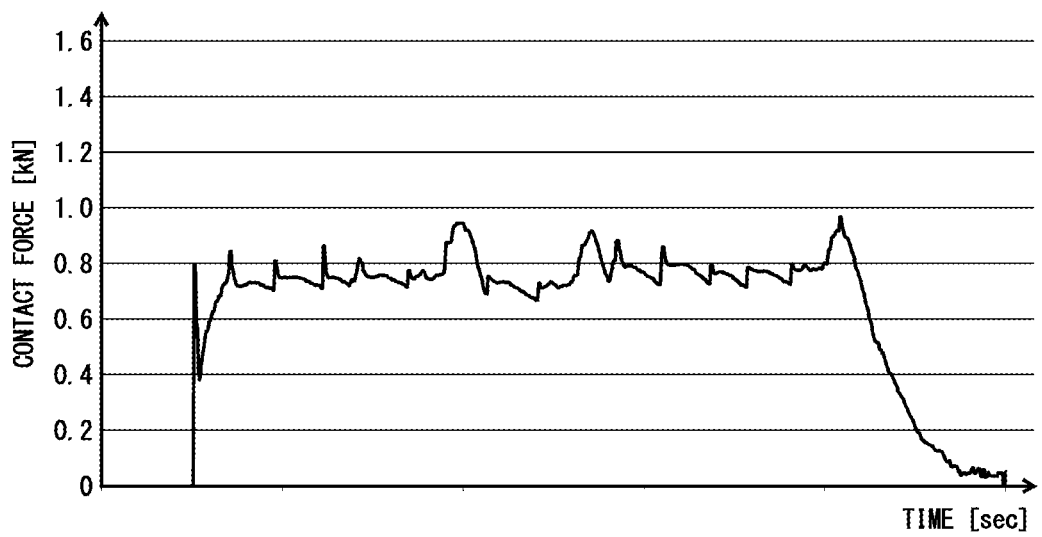
FIG. 15 is a graph showing the changes over time in the maximum contact force of the chain on the sprocket according to Embodiment 2.

Increasing the root radius widens the tooth pitch of the sprocket in relation to the chain pitch, resulting in less "play" in the chain. This helps reduce the unevenness of load distribution on the teeth as shown in FIG. 14. As shown in FIG. 15, there are no sudden fluctuations in the overall maximum value of contact force over time exerted on the sprocket, or surges in the chain tension. Therefore, this feature enhances the strength of the sprocket and rollers or the like of the chain. The term "play" here refers to the state where the teeth of the sprocket, which the chain wraps around, are not subjected to any load due to the absence of periodicity in the sprocket teeth. For illustrative purposes, FIG. 14 and FIG. 15 depict the contact forces exerted by the chain on only three successive teeth t1 to t3 as they engage with the chain in sequence.

The present invention provides a chain drive system that incorporates the aforementioned sprocket. One example of its application to be described below is in a timing system of an engine, where the system is utilized to drive the intake and exhaust valves using two camshafts located in the cylinder head.

Figure 16:
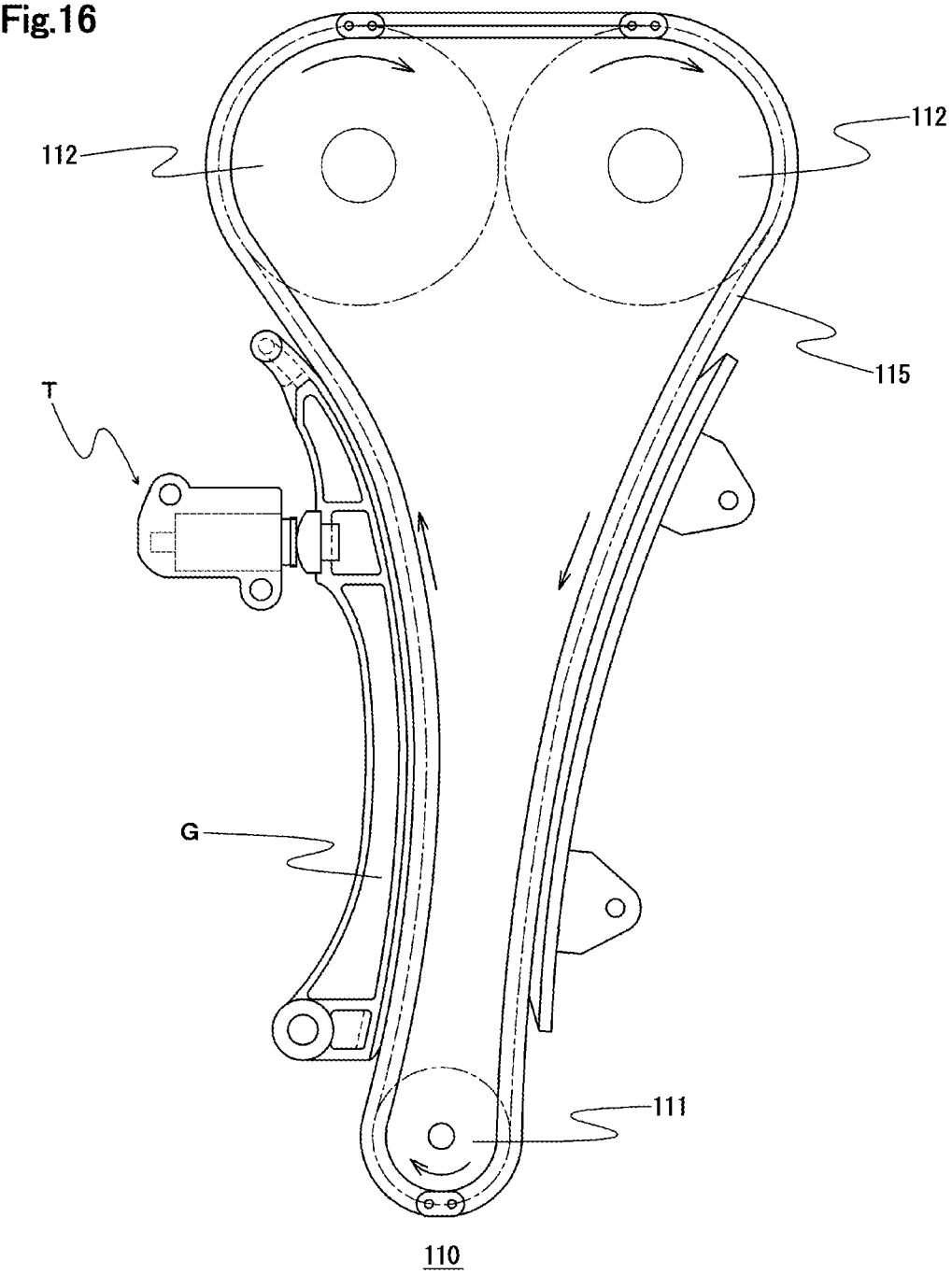
FIG. 16 is a schematic diagram illustrating a configuration in one example of a chain drive system according to the present invention.

As illustrated in FIG. 16, the chain drive system 110 includes a drive sprocket 111 provided to a crankshaft, two driven sprockets 112 provided to the camshafts, and a chain 115 passed over the drive sprocket 111 and driven sprockets 112. Reference symbol T in FIG. 16 denotes a tensioner that applies tension to the slack side of the chain 115 via a tensioner lever G as required to reduce vibration during the operation.

In this embodiment, the drive sprocket 111 and driven sprockets 112 each have a phase variation pattern that is created by continuously increasing or decreasing the root radius in accordance with the angular position along the circumferential direction. The driven sprockets 112 are configured to have a phase variation pattern in opposite phase to the phase variation pattern of the drive sprocket 111.

Figure 17:
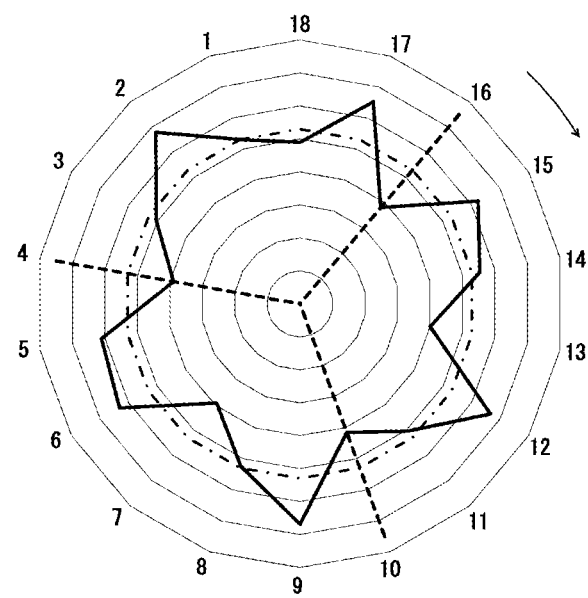
FIG. 17 is a diagram illustrating the relationship between the positions of the tooth roots of the drive sprocket and the meshing positions when engine combustion occurs.

As shown in FIG. 17, the drive sprocket 111 is designed such that the meshing positions of the teeth with a larger root radius than the root radius of the standard tooth profile (represented by the one-dot chain line curve in FIG. 17) do not coincide with the positions where combustion occurs in the engine (represented by broken lines in FIG. 17). In this embodiment, the meshing positions of the teeth with root deviations that have a peak on the negative side relative to the root radius of the sprocket of the standard tooth profile (e.g., teeth No. 4, No. 10, and No. 16) are coincided with the positions where combustion occurs in the engine.

This design helps reduce the impact of chain tension fluctuations corresponding to variations associated with the crankshaft and enables the suppression of noise and vibration. FIG. 17 is a radar chart showing radial plots of the radii of the tooth roots 102 from the same origin point. The arrow indicates the rotating direction of the drive sprocket 111.

The drive sprocket 111 preferably has a phase variation pattern that matches the pattern of periodic fluctuations of load on the camshafts. This feature effectively reduces the impact of torque changes, which are the major cause of noise and vibration.

Figure 18A:
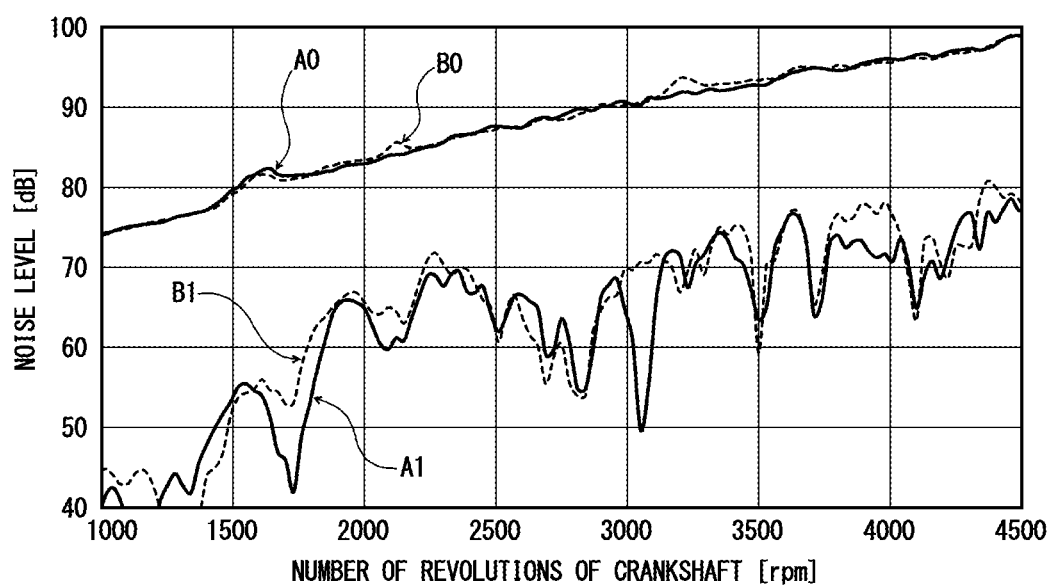
FIG. 18A is a graph showing the changes in the overall noise level and the fundamental harmonic of mesh noise of the chain drive system according to the present invention in relation to the RPM of the crankshaft.
Figure 18B:
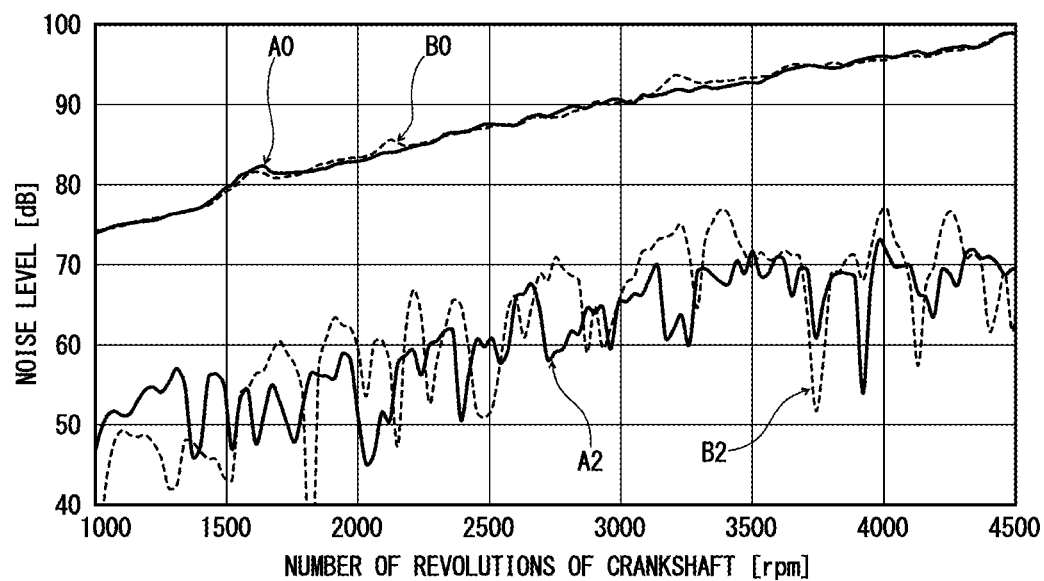
FIG. 18B is a graph showing the changes in the overall noise level and the second harmonic of mesh noise of the chain drive system according to the present invention in relation to the RPM of the crankshaft.

The impact of chain tension fluctuations resulting from load torque changes is mitigated in the chain drive system 110 as described above. As a result, as shown in FIG. 18A and FIG. 18B, the overall noise level (indicated by solid line curve A0 in FIG. 18A and FIG. 18B), the fundamental harmonic of mesh noise (indicated by solid line curve A1 in FIG. 18A), and the second harmonic of mesh noise (indicated by solid line curve A2 in FIG. 18B) are reduced, as well as the harmonics are more dispersed, as compared to a comparative chain drive system that uses sprockets having a standard tooth profile for the drive sprocket and driven sprockets. The broken line curve B0 in FIG. 18A and FIG. 18B represents the overall noise level, broken line curve B1 in FIG. 18A represents the fundamental harmonic of mesh noise, and broken line curve B2 in FIG. 18B represents the second harmonic of mesh noise of the comparative chain drive system.

Figure 19:
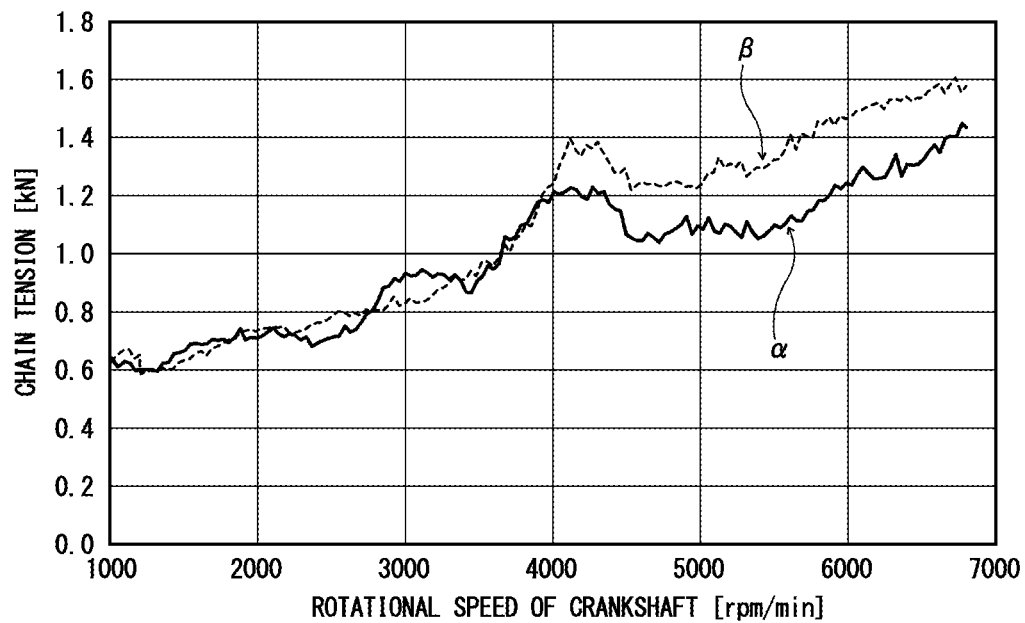
FIG. 19 is a graph showing the changes in the chain tension in relation to the RPM of the crankshaft in the chain drive system according to the present invention.

Moreover, the system is able to suppress fluctuations in inter-shaft distance so that the chain tension can be reduced as indicated by solid line curve α in FIG. 19 as compared to the case of the comparative chain drive system (indicated by broken line curve β in FIG. 19). As a result, the sprocket teeth will undergo less change in profile, so that the effects of reducing the overall noise level and mesh harmonics (specific frequency noise) can be maintained over a long time.

While embodiments of the present invention have been described above in detail, the present invention is not limited to the embodiments and may be carried out with various design changes without departing from the scope of the present invention set forth in the claims.

For example, the plurality of teeth of the sprocket may not necessarily have an identical shape, and may include tooth portions of different shapes. More specifically, the sprocket may include teeth with different heights, surface profiles, or other features.

While the drive sprocket and driven sprockets are each configured with a phase variation pattern in the chain drive system described above, the effects of the present invention are achieved if at least one of the drive sprocket and driven sprockets has the phase variation pattern. For example, the drive sprocket in the chain drive system may be a sprocket having a standard tooth profile. Both of the two driven sprockets may be a sprocket having a standard tooth profile, or only one of the driven sprockets may be a sprocket having a standard tooth profile.

The chain passed over the sprockets may be any of a silent chain, roller chain, bush chain and the like, and can be a flexible power transmission member such as a timing belt with a structure that allows it to mesh with the sprocket teeth.

What is claimed is:

1. A sprocket having a plurality of teeth that mesh with a chain,
   the plurality of teeth being designed with a waveform phase variation pattern that causes phasing to advance and retard in relation to a zero phase of engagement between equidistant teeth and a chain,
   some of tooth roots between adjacent teeth being deviated radially away from a root circle of a standard tooth profile,
   a maximum root deviation being set within a range of 2 to 7% of a tooth pitch of the teeth,
   the phase variation pattern being created by changing root radii in accordance with angular positions, the waveform phase variation pattern having an amplitude that is varied within a range of (1/7)Amax, where Amax represents a maximum amplitude.

2. The sprocket according to claim 1, wherein the tooth pitch is constant, and
   the phase variation pattern is designed such that there are cycles in the teeth that increase continuously in a circumferential direction,
   the cycles in the teeth having a minimum value set within a range of 2 to 10, and being varied within a variation range represented by a difference between maximum and minimum cycles in the teeth of no greater than 21.

3. The sprocket according to claim 1, wherein the plurality of teeth are formed to have a larger root radius than a root radius of the standard tooth profile.

4. The sprocket according to claim 1, wherein the plurality of teeth vary in tooth pitch that is represented by a distance between centers of circumferentially adjacent teeth.

5. The sprocket according to claim 4, wherein the tooth pitch is varied relative to a tooth pitch of the standard tooth profile within a range of ±1%.

6. The sprocket according to claim 1, wherein the sprocket is made from a sintered body with a porous structure designed to retain impregnated lubricating oil.

7. A chain drive system comprising a drive sprocket provided to a crankshaft, a driven sprocket provided to a camshaft, and a chain passed over the drive sprocket and the driven sprocket,
   at least one of the drive sprocket and the driven sprocket being the sprocket according to claim 1.

8. A chain drive system comprising a drive sprocket provided to a crankshaft, a driven sprocket provided to a camshaft, and a chain passed over the drive sprocket and the driven sprocket,
   at least one of the drive sprocket and the driven sprocket being the sprocket according to claim 1,
   wherein the drive sprocket is the sprocket according to claim 1, and
   the driven sprocket is configured to have a phase variation pattern in opposite phase to the phase variation pattern of the drive sprocket.

9. The chain drive system according to claim 7, wherein the drive sprocket is designed such that meshing positions of teeth with a larger root radius than a root radius of the standard tooth profile do not coincide with positions where engine combustion occurs.

10. The chain drive system according to claim 7, wherein the drive sprocket has a phase variation pattern that matches a pattern of periodic fluctuations of load on the camshaft.

* * * * *